United States Patent
Xia et al.

(10) Patent No.: US 8,724,576 B2
(45) Date of Patent: May 13, 2014

(54) METHOD AND APPARATUS FOR SENDING PHYSICAL UPLINK CONTROL CHANNEL

(75) Inventors: Shuqiang Xia, Shenzhen (CN); Dezhong Mi, Shenzhen (CN); Zhisong Zuo, Shenzhen (CN); Chunli Liang, Shenzhen (CN); Weiwei Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 200 days.

(21) Appl. No.: 13/513,763

(22) PCT Filed: Jun. 24, 2010

(86) PCT No.: PCT/CN2010/074431
§ 371 (c)(1),
(2), (4) Date: Jun. 4, 2012

(87) PCT Pub. No.: WO2010/149069
PCT Pub. Date: Dec. 29, 2010

(65) Prior Publication Data
US 2012/0250648 A1    Oct. 4, 2012

(30) Foreign Application Priority Data
Dec. 25, 2009 (CN) .......................... 2009 1 0247041

(51) Int. Cl.
*H04W 4/00* (2009.01)

(52) U.S. Cl.
USPC ........................................................ 370/329

(58) Field of Classification Search
USPC ................................................ 370/329–331
See application file for complete search history.

(56) References Cited

U.S. PATENT DOCUMENTS

| | | | |
|---|---|---|---|
| 2008/0095106 A1* | 4/2008 | Malladi et al. ................. | 370/329 |
| 2011/0319068 A1* | 12/2011 | Kim et al. ................... | 455/422.1 |
| 2012/0230258 A1* | 9/2012 | Miki .............................. | 370/328 |
| 2012/0250648 A1* | 10/2012 | Xia et al. ....................... | 370/329 |
| 2013/0121302 A1* | 5/2013 | Yang et al. .................... | 370/329 |
| 2013/0272244 A1* | 10/2013 | Cheng et al. .................. | 370/329 |
| 2013/0322391 A1* | 12/2013 | Yang et al. .................... | 370/329 |
| 2013/0336382 A1* | 12/2013 | Sole Rojals et al. ..... | 375/240.02 |

FOREIGN PATENT DOCUMENTS

| | | |
|---|---|---|
| CN | 101558678 A | 10/2009 |
| WO | 2009/057824 A1 | 5/2009 |
| WO | 2009/120797 A1 | 10/2009 |

OTHER PUBLICATIONS

International Search Report for PCT/CN2010/074431 dated Jul. 13, 2010.

* cited by examiner

*Primary Examiner* — Hassan Kizou
*Assistant Examiner* — Abdullahi Ahmed
(74) *Attorney, Agent, or Firm* — Ling Wu; Stephen Yang; Ling and Yang Intellectual Property

(57) ABSTRACT

The present invention provides a method and apparatus for sending a Physical Uplink Control Channel (PUCCH), which includes: performing a joint coding and modulation processing on Acknowledgement/Negative Acknowledgement (ACK/NACK) information which is required to be sent simultaneously with Channel Status Information (CSI) information, and sending the modulated information to a base station by using the second pilot symbol of each slot of a plurality of orthogonal PUCCH resources. The present invention acquires a coding gain by the joint coding of the ACK/NACK information and makes the minimum Hamming distance extend, thereby enhancing the feedback quality of ACK/NACK.

16 Claims, 2 Drawing Sheets

METHOD AND APPARATUS FOR SENDING PHYSICAL UPLINK CONTROL CHANNEL

TECHNICAL FIELD

The present invention relates to a Long Term Evolution-Advanced (LTE-A) technology, and particularly, to a method and apparatus for sending a Physical Uplink Control Channel (PUCCH) in an LTE-A.

BACKGROUND OF THE RELATED ART

In a PUCCH format 2b of a Long Term Evolution (LTE), a User Equipment (UE) needs to feed back Channel Status Information (CSI) and Acknowledgement/Negative Acknowledgement (ACK/NACK) information simultaneously. Wherein, with regard to CSI, after the CSI is coded and modulated into 10 symbols, it is carried by adopting 10 Orthogonal Frequency Diversity Multiplexing (OFDM) symbols of two slots; with regard to 2-bit ACK/NACK information, after the 2-bit ACK/NACK information is coded and modulated into one symbol, it is carried by adopting the second reference symbols on the two slots. FIG. 1 is a structural diagram of a PUCCH format 2b in an LTE, and as shown in FIG. 1, blank small squares show carrying the CSI information; small squares with vertical-stripe shadow show carrying reference symbols, and small squares with diagonal shadow show reference symbols carrying the ACK/NACK information.

In the LTE-A, since it introduces technologies such as coordinated multi-point Tx&Rx, carrier aggregation and high order multi-antenna, and so on, the UE needs to feed back a great deal of channel status information, and meanwhile, since uplink multi-antenna is supported in the LTE-A, a PUCCH sending method based on the multi-antenna becomes an issue of concern increasingly.

At present, when the number of uplink antennas is M, a typical sending method of the PUCCH format 2b is: after the CSI is coded and modulated, sending it to a base station through M orthogonal PUCCH resources, wherein each transmitting antenna adopts one orthogonal PUCCH resource. In the PUCCH format 2b based on multiple antennas in the LTE-A, a traditional sending method for the ACK/NACK information is: after the 2-bit ACK/NACK information is modulated by a Quadrature Phase Shift Keying (QPSK) signal, sending it by using repeatedly the second reference symbols on different slots of the PUCCH channel on different antennas. In this method, it is equivalent to coding the 2-bit ACK/NACK information repeatedly to generate 8-bit information and send to the base station; and the minimum Hamming distance is relatively short in the repeated coding, thus the feedback performance of ACK/NACK is limited.

However, in the LTE/LTE-A system, the base station judges whether the sent data is needed to be retransmitted according to the ACK/NACK information fed back by the UE, and if errors occur in the ACK/NACK information fed back, information loss or unnecessary retransmission will be caused and communication quality is seriously influenced.

SUMMARY OF THE INVENTION

In view of this, the main purpose of the present invention is to provide a method and apparatus for sending a physical uplink control channel, which can enhance the feedback quality of ACK/NACK information, thereby guaranteeing the communication quality.

To achieve the foregoing purpose, the technical scheme of the present invention is implemented as follows.

A method for sending a Physical Uplink Control Channel (PUCCH) comprises:

performing a joint coding and modulation processing on Acknowledgement/Negative Acknowledgement (ACK/NACK) information which is required to be sent simultaneously with Channel Status Information (CSI) information;

sending the modulated information by using a second pilot symbol of each slot of a plurality of orthogonal PUCCH resources.

The step of sending the modulated information is: on the second pilot symbol of each slot of each orthogonal PUCCH resource, sending the modulated information in sequence.

The modulated information is 2*M modulation symbols: Q(1),Q(2), ... Q(2M), wherein M is the number of orthogonal PUCCH resources; and the step of sending the modulated information comprises:

sending Q(1) on the second pilot symbol of the first slot of the first orthogonal PUCCH resource; sending Q(2) on the second pilot symbol of the second slot of the first orthogonal PUCCH resource; and sending Q(3) on the second pilot symbol of the first slot of the second orthogonal PUCCH resource, and so forth, until Q(2M) is sent on the second pilot symbol of the second slot of the $M^{th}$ orthogonal PUCCH resource.

The ACK/NACK information is 2 bits, which are denoted by a1 and a2 respectively;

when M=2, the 4*M=8 coding bits after the joint coding are: a1,a2,a3,a1,a2,a3,a1,a2;

when M=3, the 4*M=12 coding bits after the joint coding are: a1,a2,a3,a1,a2,a3,a1,a2,a3,a1,a2,a3;

when M=4, the 4*M=16 coding bits after the joint coding are: a1,a2,a3,a1,a2,a3,a1,a2,a1,a2,a3,a1,a2,a3,a1,a2;

wherein, a3=(a1 a2+) mod 2, and mod denotes a modular arithmetic;

a sequence of the 4*M coding bits generated after the joint coding according to the number of different orthogonal PUCCH resources M is able to be adjusted.

The ACK/NACK information is 2 bits, which are denoted by a1 and a2 respectively; and the first 4 coding bits in the coded information are a1,a2,a1,a2.

When M=2, the 4*M=8 coding bits after the joint coding are: a1,a2,a1,a2,a3,a1,a3,a2;

when M=3, the 4*M=12 coding bits after the joint coding are: a1,a2,a1,a2,a3,a1,a3,a2,a3,a1,a3,a2;

when M=4, the 4*M=16 coding bits after the joint coding are: a1,a2,a1,a2,a3,a1,a3,a2,a1,a2,a1,a2,a3,a1,a3,a2,;

wherein, a3=(a1 a2+) mod 2, and mod denotes a modular arithmetic;

in the 4*M coding bits generated after the joint coding according to the number of different orthogonal PUCCH resources M, a sequence of other coding bits except the first 4 bits is able to be adjusted.

The number of orthogonal PUCCH resources M is no greater than the number of transmitting antennas; or, the number of orthogonal PUCCH resources M is equal to the number of transmitting antennas, and each transmitting antenna uses one orthogonal PUCCH resource to send at the moment; or, the number of transmitting antennas is greater than the number of orthogonal PUCCH resources M, and multiple transmitting antennas use the same orthogonal PUCCH resource to send at the moment.

An apparatus for sending a Physical Uplink Control Channel (PUCCH) mainly comprises a coding and modulation unit and a sending unit, wherein, the coding and modulation unit is configured to: perform a joint coding and modulation processing on Acknowledgement/Negative Acknowledgement (ACK/NACK) information which is required to be sent simultaneously with Channel Status Information (CSI) information, and output the modulated information to the sending unit;

the sending unit is configured to: send the modulated information by using a second pilot symbol of each slot of a plurality of orthogonal PUCCH resources.

The sending unit is configured to: on the second pilot symbol of each slot of each orthogonal PUCCH resource, send the modulated information in sequence.

The ACK/NACK information is 2 bits, which are denoted by a1 and a2 respectively; and the first 4 coding bits in the coded information are a1,a2,a1,a2.

The number of orthogonal PUCCH resources M is no greater than the number of transmitting antennas; or, the number of orthogonal PUCCH resources M is equal to the number of transmitting antennas, and each transmitting antenna uses one orthogonal PUCCH resource to send at the moment; or, the number of transmitting antennas is greater than the number of orthogonal PUCCH resources M, and multiple transmitting antennas use the same orthogonal PUCCH resource to send at the moment.

It can be seen from the above technical scheme provided by the present invention that, it comprises performing the joint coding and modulation processing on the ACK/NACK information which is required to be sent simultaneously with the CSI information and sending the modulated information to the base station by using the second pilot symbol of each slot of a plurality of orthogonal PUCCH resources. The present invention acquires the coding gain by the joint coding on the ACK/NACK information and makes the minimum Hamming distance maximize, thereby enhancing the feedback quality of ACK/NACK.

PREFERRED EMBODIMENTS OF THE PRESENT INVENTION

Figure 2:
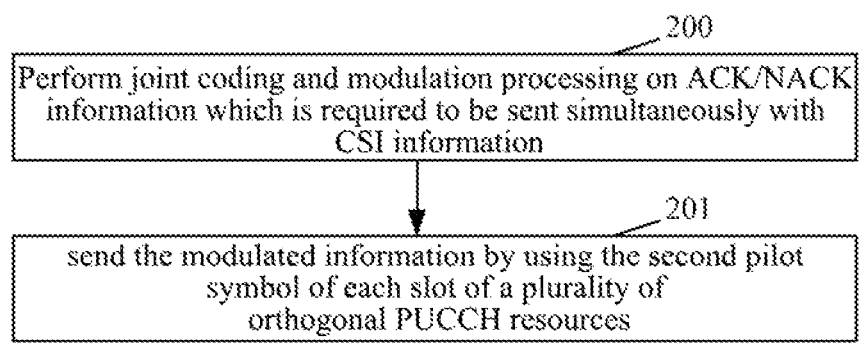
FIG. 2 is a flow chart of a method for sending a PUCCH format 2b according to the present invention.

FIG. 2 is a flow chart of a method for sending a PUCCH format 2b according to the present invention, and as shown in FIG. 2, the method comprises the following steps.

In step 200, a joint coding and modulation processing are performed on ACK/NACK information which is required to be sent simultaneously with CSI information.

In that step, a coding gain is acquired by the joint coding on the ACK/NACK information, which extends the minimum Hamming distance, thereby enhancing the feedback quality of ACK/NACK.

In step 201, the modulated information is sent to a base station by using the second pilot symbol of each slot of a plurality of orthogonal PUCCH resources.

It is assumed that the number of available orthogonal PUCCH resources is M and each orthogonal PUCCH resource has two slots, the method of the present invention is specifically as follows.

At first, the joint coding is performed on the ACK/NACK information to generate 4*M coding bits, and then after going through the QPSK modulation, 2*M modulation symbols are generated. Here, the specific implementation of the joint coding and the QPSK modulation belongs to conventional technical means of those skilled in the art, which will not be repeated.

Then, these modulation symbols are sent in sequence on the second pilot symbol of each slot of each orthogonal PUCCH resource. It is assumed that the 2*M modulation symbols generated after modulating are: Q(1), Q(2), . . . Q(2M), then, Q(1) is sent on the second pilot symbol of the first slot of the first orthogonal PUCCH resource; Q(2) is sent on the second pilot symbol of the second slot of the first orthogonal PUCCH resource; and Q(3) is sent on the second pilot symbol of the first slot of the second orthogonal PUCCH resource, and so forth, until Q(2M) is sent on the second pilot symbol of the second slot of the $M^{th}$ orthogonal PUCCH resource.

Preferably, it is assumed that the ACK/KNACK information is 2 bits, which are denoted by a1 and a2 respectively, and when the number of available orthogonal PUCCH resources is M (M=2, 3, 4), coding of the ACK/KNACK information uses the following forms.

When M=2, the joint coding is performed on the 2-bit ACK/NACK information, and the 4*M=8 coding bits after coding are: a1,a2,a3,a1,a2,a3,a1,a2, wherein, a3=(a1 a2+) mod 2, and mod denotes modular arithmetic;

when M=3, the joint coding is performed on the 2-bit ACK/NACK information, and the 4*M=12 coding bits after coding are: a1,a2,a3,a1,a2,a3,a1,a2,a3,a1,a2,a3, wherein, a3=(a1 a2+) mod 2.

when M=4, the joint coding is performed on the 2-bit ACK/NACK information, and the 4*M=16 coding bits after coding are: a1,a2,a3,a1,a2,a3,a1,a2,a1,a2,a3,a1,a2,a3,a1,a2, wherein, a3=(a1 a2+) mod 2. It can be easily seen that, the coding bits when M=4 is a result of repeating the coding bits when M=2.

It should be illustrated that, the sequence of the 4*M coding bits generated according to the number of different orthogonal PUCCH resources can be adjusted. Particularly, since the UE in the LTE-A has the ability of switching to a single antenna automatically, in the single antenna mode, what are sent by the UE on the second pilot symbol of the first slot of the PUCCH resources are the modulation symbols corresponding to a1,a2, and what are sent on the second pilot symbol of the second slot are also the modulation symbols corresponding to a1,a2. Therefore, a preferred adjustment for the above sequence of the coding bits is that: the first 4 coding bits are a1,a2,a1,a2 and the sequence of other coding bits can be unlimited.

The method of the present invention can be expanded to a situation that the number of the available orthogonal PUCCH resources M is greater than 4; but, since the problem of large resource overhead will be brought, that situation is less applied in practice, which will not be repeated here.

Generally, the number of available orthogonal PUCCH resources M is no greater than the number of transmitting antennas. When the number of available orthogonal PUCCH resources M is equal to the number of transmitting antennas, each transmitting antenna uses one orthogonal PUCCH resource to send; and when the number of transmitting antennas is greater than the number of orthogonal PUCCH resources M, a situation that multiple transmitting antennas use the same orthogonal resource to send will occur.

Figure 3:
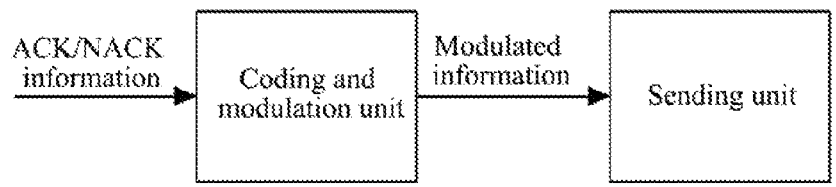
FIG. 3 is a schematic diagram of a composition structure of an apparatus for sending a PUCCH format 2b according to the present invention.

FIG. 3 is a schematic diagram of a composition structure of an apparatus for sending a PUCCH format 2b according to the present invention, and as shown in FIG. 3, the apparatus mainly comprises a coding and modulation unit and a sending unit.

The coding and modulation unit is used to: perform a joint coding and modulation processing on ACK/NACK information which is required to be sent simultaneously with CSI information, and output the modulated information to the sending unit.

The sending unit is used to: send the modulated information by using the second pilot symbol of each slot of a plurality of orthogonal PUCCH resources.

The method of the present invention will be described in detail in combination with several examples below.

In the first example, it is assumed that the initial ACK/NACK information (a1,a2) is (1, 0), and the number of available orthogonal PUCCH resources M is 2, the preferred method of the present invention is used to code the ACK/NACK information. The 8-bit information a1,a2,a3,a1,a2,a3, a1,a2 after coding is (1, 0, 1, 1, 0, 1, 1, 0), and then after going through the QPSK modulation, the corresponding 4 modulation symbols are (j, −1, −j, j).

With the above coding method given by the present invention, maximization of the minimum Hamming distance can be realized. Here, the coding method given by the present example is compared with the simple and repeated coding method: the initial ACK/NACK information (a1,a2) has four values of (1, 1), (1, 0), (0, 1) and (0, 0) totally, after adopting the coding method given by the present invention, the corresponding coded information is respectively: (1, 1, 0, 1, 1, 0, 1, 1), (1, 0, 1, 1, 0, 1, 1, 0), (0, 1, 1, 0, 1, 1, 0, 1) and (0, 0, 0, 0, 0, 0, 0, 0), and the minimum Hamming distance of the four coding bits, i.e., a minimum bit number of difference between each coding bit, is 5; and, if the existing repeated coding is used, the corresponding four groups of coding information are respectively: (1, 1, 1, 1, 1, 1, 1, 1), (1, 0, 1, 0, 1, 0, 1, 0), (0, 1, 0, 1, 0, 1, 0, 1) and (0, 0, 0, 0, 0, 0, 0, 0), and the minimum Hamming distance of the four groups of coding information is 4. It can be seen that the maximization of the minimum Hamming distance can be realized by using the present invention, thereby enhancing the performance of coding and decoding.

Figure 1:
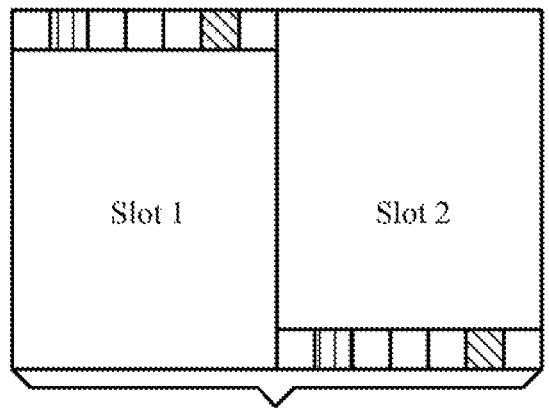
FIG. 1 is a structural diagram of a PUCCH format 2b in an LTE.
Figure 4:
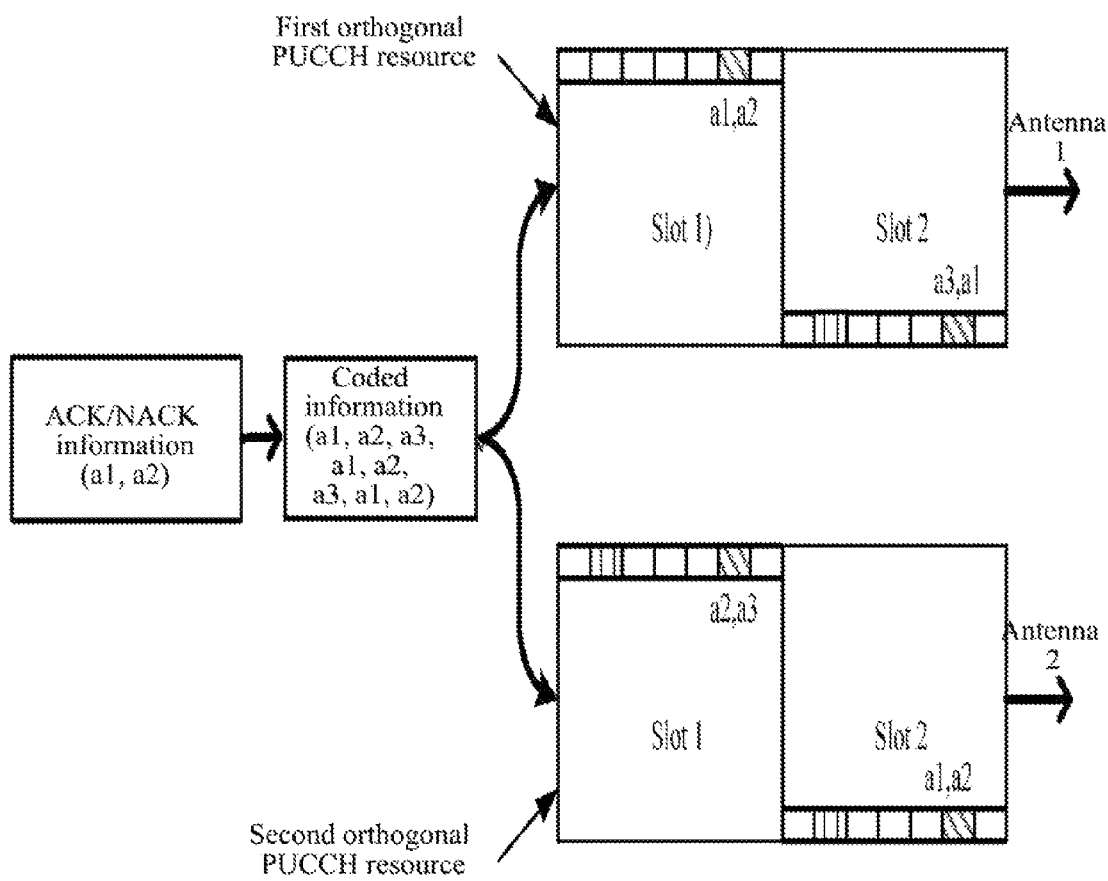
FIG. 4 is a schematic diagram of an example for sending a PUCCH format 2b in an LTE according to the present invention.

According to the method of the present invention as shown in FIG. 1, based on the PUCCH format 2b in the LTE, the first modulation symbol is carried on the second reference symbol of the first slot of the first orthogonal PUCCH resource, and the second modulation symbol is carried on the second reference symbol of the second slot of the first orthogonal PUCCH resource; and, the third modulation symbol is carried on the second reference symbol of the first slot of the second orthogonal PUCCH resource, and the fourth modulation symbol is carried on the second reference symbol of the second slot of the second orthogonal PUCCH resource. As the small squares with diagonal shadow shown in FIG. 4, FIG. 4 is a schematic diagram of an example for sending a PUCCH format 2b in an LTE according to the present invention.

Further, in consideration of the UE possessing the ability of switching automatically to the single antenna in the LTE-A, in order to guarantee that the UE can also acquire the accurate ACK/NACK information at the moment, the sequence of the above 8-bit information is adjusted as a1,a2,a1,a2,a3,a1,a3, a2, the 8-bit information is (1, 0, 1, 0, 1, 1, 1, 0), and the 4 modulation symbols after going through the QPSK modulation are (j, j, −1, j). According to the method of the present invention, the above 4 modulation symbols are sent to a base station through M orthogonal PUCCH resources. The first 4 bits of coding information are (a1, a2, a1, a2), which are the same with the sending information in the sending mode of the single antenna in the LTE, therefore, it guarantees that, after the UE switches to the single antenna, the base station can still acquire the ACK/NACK information accurately.

In the second example, it is assumed that the initial ACK/NACK information (a1,a2) is (1, 1), and the number of available orthogonal PUCCH resources is M=3, the preferred method of the present invention is used to code the ACK/NACK information, the 12-bit information a1,a2,a3,a1,a2,a3, a1,a2,a3,a1,a2,a3 after coding is (1, 1, 0, 1, 1, 0, 1, 1, 0, 1, 1, 0), and then after going through the QPSK modulation, the corresponding 6 modulation symbols are (−1, −j, j, −1, −j, j).

According to the method of the present invention as shown in FIG. 1, based on the PUCCH format 2b in the LTE, the first modulation symbol is carried on the second reference symbol of the first slot of the first PUCCH, and the second modulation symbol is carried on the second reference symbol of the second slot of the first PUCCH; the third modulation symbol is carried on the second reference symbol of the first slot of the second PUCCH, and the fourth modulation symbol is carried on the second reference symbol of the second slot of the second PUCCH; and, the fifth modulation symbol is carried on the second reference symbol of the first slot of the third PUCCH, and the sixth modulation symbol is carried on the second reference symbol of the second slot of the third PUCCH.

Further, in consideration of the UE possessing the ability of switching automatically to the single antenna in the LTE-A, in order to guarantee that the UE can also acquire the accurate ACK/NACK information at the moment, the sequence of the above 12-bit information is adjusted as a1,a2,a1,a2,a3,a1,a3, a2,a3,a1,a3,a2, the 12-bit information is (1, 1, 1, 1, 0, 1, 0, 1, 0, 1, 0, 1), and the 6 modulation symbols after going through the QPSK modulation are (−1, −1, −j, −j, −j, −j). According to the method of the present invention, the above 6 modulation symbols are sent to the base station through M orthogonal PUCCH resources. The first 4 bits of coding information are (a1, a2, a1, a2), which are the same with the sending information in the sending mode of the single antenna in the LTE, therefore, it guarantees that, after the UE switches to the single antenna, the base station can still acquire the ACK/NACK information accurately.

In the third example, it is assumed that the initial ACK/NACK information (a1,a2) is (0, 1), and the number of available orthogonal PUCCH resources is M=4, the preferred method of the present invention is used to code the above ACK/NACK information, the 16-bit information a1,a2,a3,a1, a2,a3,a1,a2,a1,a2,a3,a1,a2,a3,a1,a2 after coding is (0, 1, 1, 0, 1, 1, 0, 1, 0, 1, 1, 0, 1, 1, 0, 1), and then after going through the QPSK modulation, the corresponding 8 modulation symbols are (−j, j, −1, −j, −j, j, −1, −j).

According to the method of the present invention as shown in FIG. 1, based on the PUCCH format 2b in the LTE, the first modulation symbol is carried on the second reference symbol of the first slot of the first PUCCH, and the second modulation symbol is carried on the second reference symbol of the second slot of the first PUCCH; the third modulation symbol is carried on the second reference symbol of the first slot of the second PUCCH, and the fourth modulation symbol is carried on the second reference symbol of the second slot of the second PUCCH; the fifth modulation symbol is carried on the second reference symbol of the first slot of the third PUCCH, and the sixth modulation symbol is carried on the second reference symbol of the second slot of the third PUCCH; and, the seventh modulation symbol is carried on the second reference symbol of the first slot of the fourth PUCCH, and the eighth modulation symbol is carried on the second reference symbol of the second slot of the fourth PUCCH.

Further, in consideration of the UE possessing the ability of switching automatically to the single antenna in the LTE-A, in order to guarantee that the UE can also acquire the accurate ACK/NACK information at the moment, the sequence of the above 16-bit information is adjusted as a1,a2,a1,a2,a3,a1,a3, a2,a1,a2,a1,a2,a3,a1,a3,a2, the 16-bit information is (0, 1, 0, 1, 1, 0, 1, 1, 0, 1, 0, 1, 1, 0, 1, 1), and the 8 modulation symbols after going through the QPSK modulation are (−j, −j, j, −1, −j, −j, j, −1). According to the method of the present invention, the above 8 modulation symbols are sent to the base station through M orthogonal PUCCH resources. The first 4 bits of coding information are (a1, a2, a1, a2), which are the same with the sending information in the sending mode of the single antenna in the LTE, therefore, it guarantees that, after the UE switches to the single antenna, the base station can still acquire the ACK/NACK information accurately.

In the fourth example, it is assumed that the initial ACK/NACK information (a1,a2) is (1, 1), and the number of available orthogonal PUCCH resources is M=4, a Reed-Muller coding is used to code the ACK/NACK information in the fourth example, the 16-bit information a1,a2,a3,a1,a2,a3,a1, a2,a1,a2,a3,a1,a2,a3,a1,a2 after coding is (0, 0, 1, 1, 0, 0, 1, 1, 0, 1, 1, 0, 1, 0, 1, 0), and then after going through the QPSK modulation, the corresponding 8 modulation symbols are (1, −1, 1, −1, −j, j, j, −j).

According to the method of the present invention as shown in FIG. 1, based on the PUCCH format 2b in the LTE, the first modulation symbol is carried on the second reference symbol of the first slot of the first PUCCH, and the second modulation symbol is carried on the second reference symbol of the second slot of the first PUCCH; the third modulation symbol is carried on the second reference symbol of the first slot of the second PUCCH, and the fourth modulation symbol is carried on the second reference symbol of the second slot of the second PUCCH; the fifth modulation symbol is carried on the second reference symbol of the first slot of the third PUCCH, and the sixth modulation symbol is carried on the second reference symbol of the second slot of the third PUCCH; and, the seventh modulation symbol is carried on the second reference symbol of the first slot of the fourth PUCCH, and the eighth modulation symbol is carried on the second reference symbol of the second slot of the fourth PUCCH.

The above description is only the preferred embodiments of the present invention, and is not intended to limit the protection scope of the present invention. Any modification, equivalent, and improvement, etc., made within the spirit and principle of the present invention shall fall into the protection scope of the present invention.

What is claimed is:

1. A method for sending a Physical Uplink Control Channel (PUCCH) information, comprising:
    performing a joint coding and modulation processing on Acknowledgement/Negative Acknowledgement (ACK/NACK) information which is required to be sent simultaneously with Channel Status Information (CSI) information;
    sending the modulated information by using a second pilot symbol of each slot of a plurality of orthogonal PUCCH resources;
    wherein, the step of sending the modulated information is: on he second pilot symbol of each slot of each orthogonal PUCCH resource, sending the modulated information in sequence;
    wherein, the modulated information is 2*M modulation symbols: Q(1),Q(2), ... Q(2M), wherein M is the number of orthogonal PUCCH resources.

2. The method according to claim 1 wherein, the step of sending the modulated information comprises:
    sending Q(1) on the second pilot symbol of the first slot of the first orthogonal PUCCH resource; sending Q(2) on the second pilot symbol of the second slot of the first orthogonal PUCCH resource; and sending Q(3) on the second pilot symbol of the first slot of the second orthogonal PUCCH resource, and so forth, until Q(2M) is sent on the second pilot symbol of the second slot of the $M^{th}$ orthogonal PUCCH resource.

3. The method according to claim 2, wherein, the ACK/NACK information is 2 bits, which are denoted by a1 and a2 respectively;
    when M=2, the 4*M=8 coding bits after the joint coding are: a1,a2,a3,a1,a2,a3,a1,a2;
    when M=3, the 4*M=12 coding bits after the joint coding are: a1,a2,a3,a1,a2,a3,a1,a2,a3,a1,a2,a3;
    when M=4, the 4*M=16 coding bits after the joint coding are: a1,a2,a3,a1,a2,a3,a1,a2,a1,a2,a3,a1,a2,a3,a1,a2;
    wherein, a3=(a1+a2) mod 2, and mod denotes a modular arithmetic;
    a sequence of the 4*M coding bits generated after the joint coding according to the number of different orthogonal PUCCH resources M is able to be adjusted.

4. The method according to claim 2, wherein, the ACK/NACK information is 2 bits, which are denoted by a1 and a2 respectively; and the first 4 coding bits in the coded information are a1,a2,a1,a2.

5. The method according to claim 4, wherein, when M=2, the 4*M=8 coding bits after the joint coding are: a1,a2,a1,a2,a3,a1,a3,a2;
    when M=3, the 4*M=12 coding bits after the joint coding are: a1,a2,a1,a2,a3,a1,a3,a2,a3,a1,a3,a2 ;
    when M=4, the 4*M=16 coding bits after the joint coding are: a1,a2,a1,a2,a3,a1,a3,a2,a1,a2,a1,a2,a3,a1,a3,a2;
    wherein, a3=(a1+a2) mod 2, and mod denotes a modular arithmetic;
    in the 4*M coding bits generated after the joint coding according to the number of different orthogonal PUCCH resources M, a sequence of other coding bits except the first 4 bits is able to be adjusted.

6. The method according to claim 1, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

7. An apparatus for sending a Physical Uplink Control Channel (PUCCH) information, comprising a coding and modulation unit and a sending unit, wherein,
    the coding and modulation unit is configured to: perform a joint coding and modulation processing on Acknowledgement/Negative Acknowledgement (ACK/NACK) information which is required to be sent simultaneously with Channel Status Information (CSI) information, and output the modulated information to the sending unit;

the sending unit is configured to: send the modulated information by using a second pilot symbol of each slot of a plurality of orthogonal PUCCH resources wherein, the sending unit sending the modulated information in following way: on the second pilot symbol of each slot of each orthogonal PUCCH resource, sending the modulated information sequence;

wherein, the modulated information is 2*M modulation symbols: Q(1),Q(2), ... Q(2M), wherein M is the number of orthogonal PUCCH resources.

8. The apparatus according to claim 7, wherein, the ACK/NACK information is 2 bits, which are denoted by a1 and a2 respectively; and the first 4 coding bits in the coded information are a1,a2,a1,a2.

9. The apparatus according to claim 7, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

10. The method according to claim 1, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

11. The method according to claim 2, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

12. The method according to claim 3, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

13. The method according to claim 4, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

14. The method according to claim 5, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

15. The apparatus according to claim 7, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

16. The apparatus according to claim 8, wherein, the number of orthogonal PUCCH resources M is no greater than the number of transmitting antennas; or,
    the number of orthogonal PUCCH resources M is equal to the number of transmitting antennas, and each transmitting antenna uses one orthogonal PUCCH resource to send at the moment; or,
    the number of transmitting antennas is greater than the number of orthogonal PUCCH resources M, and multiple transmitting antennas use the same orthogonal PUCCH resource to send at the moment.

* * * * *